(12) United States Patent
Sipher et al.

(10) Patent No.: US 7,764,952 B1
(45) Date of Patent: Jul. 27, 2010

(54) DISTRIBUTION OF AUDIO CONTENT USING MOBILE TELECOMMUNICATION DEVICES

(75) Inventors: Joseph K. Sipher, Sunnyvale, CA (US); Gregory S. Woock, San Jose, CA (US); Jocelyn F. Cloutier, Menlo Park, CA (US); Jesse V. Green, Los Gatos, CA (US); Jason Shih-Yen Chang, Cupertino, CA (US)

(73) Assignee: Pinger, Inc., San Jose, CA (US)

( * ) Notice: Subject to any disclaimer, the term of this patent is extended or adjusted under 35 U.S.C. 154(b) by 496 days.

(21) Appl. No.: 11/852,042

(22) Filed: Sep. 7, 2007

(51) Int. Cl.
*H04M 3/42* (2006.01)
(52) U.S. Cl. .................. 455/414.1; 455/3.06; 455/419; 455/466
(58) Field of Classification Search .............. 455/414.1, 455/3.06, 3.01, 412.1, 412.2, 413, 414.4, 455/414.2, 517, 418, 419, 420, 452.1, 466, 455/510, 414.3, 3.04; 725/39, 50; 726/26, 726/28, 27; 370/310, 401
See application file for complete search history.

(56) References Cited

U.S. PATENT DOCUMENTS

| | | | |
|---|---|---|---|
| 6,011,833 A | 1/2000 | West | |
| 6,246,752 B1 | 6/2001 | Bscheider et al. | |
| 6,643,355 B1 | 11/2003 | Tsumpes | |
| 6,950,502 B1 | 9/2005 | Jenkins | |
| 6,990,094 B1 | 1/2006 | O'Neal et al. | |
| 7,339,492 B1 * | 3/2008 | Alexander | 340/825.69 |
| 2005/0020250 A1 * | 1/2005 | Chaddha et al. | 455/414.1 |
| 2006/0018441 A1 | 1/2006 | Timmins et al. | |
| 2006/0198504 A1 | 9/2006 | Shemisa et al. | |
| 2006/0248168 A1 * | 11/2006 | Nishimura et al. | 709/219 |

* cited by examiner

*Primary Examiner*—John Lee
(74) *Attorney, Agent, or Firm*—Raubvogel Law Office

(57) ABSTRACT

The invention relates to a media system and a method for providing a messaging service. One example media system includes a database containing digital media files, each digital media file associated with one or more categories. A subscription service receives and records subscription requests from subscribers, where each subscription request relates to one of the categories. A receiving module receives a new digital media file from a subscriber, wherein the identifier identifies the one or more categories with which the new digital media file is to be associated. A transmission module provides the new digital media file to the subscribers of the category that is associated with the new digital media file.

8 Claims, 3 Drawing Sheets

DISTRIBUTION OF AUDIO CONTENT USING MOBILE TELECOMMUNICATION DEVICES

BACKGROUND

1. The Field of the Invention

The present invention relates generally to messaging and media broadcasting systems. More specifically, the present invention relates to methods and systems for providing a subscription-based media broadcasting system that allows all subscribers to generate and access media content.

2. The Relevant Technology

A podcast is a media file that is distributed over the Internet using syndication feeds for playback on mobile devices and personal computers. Podcasts are typically used to share audio content through use of the RSS 2.0 protocol. Originally, RSS was used as a way of syndicating traditional web content, such as HTML pages, but podcasting utilizes an enclosure tag within an item of the XML document, which includes a link to a file, which may include audio, video, an image, a download link, or any form of content addressable by a URL. Podcasts are typically organized into episodes, much like a radio program. A user can subscribe to the podcast by visiting the website that hosts the RSS feed, and following a subscription procedure.

In its inception, podcasting was intended to be "long tail" in nature, meaning that podcasts would make it easier for the creators to reach niche markets and for consumers to find niche content and products. Furthermore, podcasting was intended to broaden the base of those who were able to create media content, in comparison to radio and other traditional forms of broadcasting. Although podcasting has made progress in the area of providing a long tail medium for distributing media content, the practicalities of podcasting have created barriers that limit the number of people who are able to create and receive the media content.

For example, in order to create a podcast, the creator is typically required to have access to a computer, a broadband connection, uploading capability, recording software, a microphone, and the like. Because podcasting stems from a radio background, podcasting has adopted a radio format, such as a time limit, music content, introduction music, and the like. Therefore, the podcast creator is often required to have editing software as well. Similarly, in order to listen to a podcast, the listener must also have a computer, a broadband connection, downloading capability, an iPod or other music player, and the like. Due to the technical requirements listed above, the long tail theory of podcasting is somewhat limited. Furthermore, the interactivity between a podcast creator and listener is inherently limited. Typically, a podcast listener has little or no input as to the content of a podcast, and cannot submit content that will be included within the podcast.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

These and other limitations are overcome by embodiments of the invention, which relate to a media messaging service for allowing all subscribers to conveniently generate and access media content. One embodiment is directed to a method of providing a messaging service. The method includes receiving an audio file and an identifier from a subscriber via a mobile telephone. The identifier is used to identify a category containing audio files relating to a common topic. The audio file is stored in a database containing the digital media files contained within the identified category. The method identifies other subscribers of the identified category and provides the audio file to at least a portion of the other subscribers of the identified category. The subscribers may receive the audio file using their mobile telephones. Each subscriber can then submit additional audio information via their mobile telephones which is automatically distributed to the other subscribers of the identified category.

Another embodiment described in more detail herein includes a media system for providing a media distribution server. The system includes a database containing digital media files, such as audio files, each digital media file associated with one or more categories. Users may subscribe to the service by selecting categories that are of interest. A subscription service receives and records subscription requests from subscribers, where each subscription request relates to one of the categories. A receiving module receives a new digital media file and an identifier from a subscriber that may be submitted by the subscriber using a mobile telephone, wherein the identifier identifies the one or more categories with which the new digital media file is to be associated. A transmission module provides the new digital media file to the subscribers of the category that is associated with the new digital media file. The system allows each subscriber of the service to submit new media files for a given category, and the new media files are distributed to the other subscribers of the category.

Variations of the illustrated embodiments are also provided. For example, one example embodiment is relates to a method for providing a mobile telephone messaging and distribution service. The method includes receiving a call from a mobile telephone, and instructing a user of the mobile telephone to begin speaking. The voice data received from the user is then recorded onto a storage device, and is associated with a category designated for a common topic. Subscribers of the category are then notified of the newly received voice data and provided access to the voice data.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to a messaging service that allows mobile device users to conveniently generate a media broadcast. Users are able to create the media broadcast without the requirement of a computer, a microphone, editing software, or other equipment. Once the media broadcast has been created by the user, the media can be automatically distributed to other subscribers of the service. The messaging service also allows the other subscribers of the service to add content to the media experience, also by simply using their mobile devices.

Figure 1:
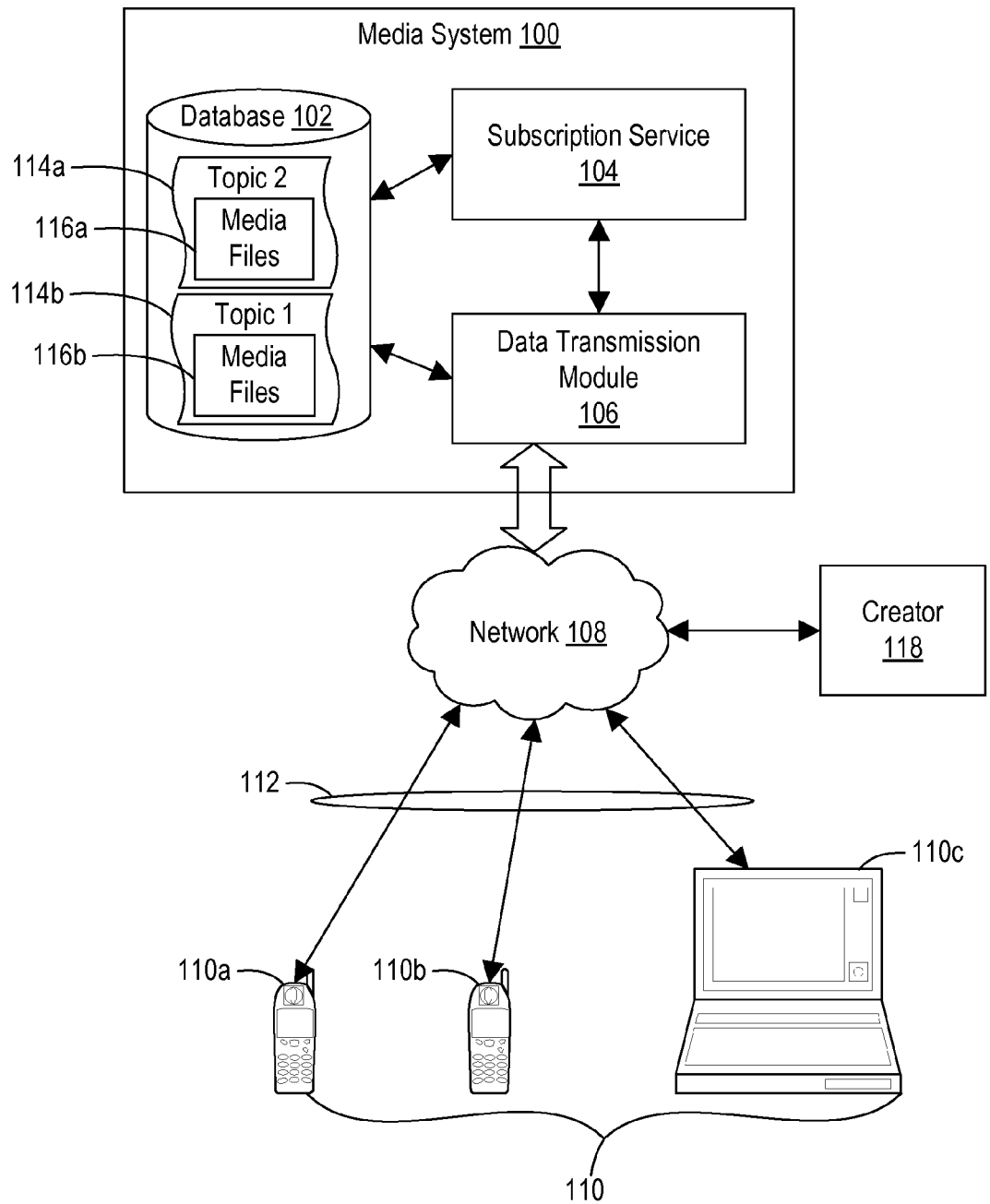
FIG. 1 illustrates an example media system for compiling and distributing medial content.

Referring now to FIG. 1, a more detailed example of one embodiment of a media system 100 is illustrated. The media system 100 may include a database 102, a subscription service 104 and a data transmission module 106. The data transmission module 106 may communicate with one or more electronic client devices 110, such as mobile telephones 110a and 110b and a portable computer 110c through a network 108. The data transmission module 106 may communicate with the client devices 110 via various transmission mediums 112, including wired and wireless mediums (LAN, WAN, land telephone lines, and the like). Exemplary networks 108 may include, by way of example, wired and wireless computer networks (LAN, WAN, Internet, WiFi, WiMax, EVDO, Edge Networks, GPRS, and the like), satellite networks, terrestrial networks, cellular and land telephone networks, and the like. The transmission module 106 may include many different communication devices for communicating data via any of the above communication mediums.

The media system 100 provides a subscription service that compiles and distributes media content. In general, the database 102 organizes the media content into categories or topics 114a and 114b, where each topic relates to subject matter that is of interest to one or more subscribers. Users may subscribe to one or more of the topics 114 using the subscription service 104. The system allows for interactivity between users. Upon subscribing to a topic 114, any user may add to the content of the topic, for example, by connecting to the media system 100 with a mobile telephone 110a or 110b, selecting one of the topics 114, and leaving an audio voice message. The media system 100 adds the voice message to the appropriate topic 114 and distributes the voice message to the other subscribers of the topic. For example, the media system 100 may communicate the new voice message to the other subscribers via the subscribers' mobile telephones 110a or 110b. This process may repeat itself indefinitely, wherein each of the subscribers may add media content to any of the topics 114 they have subscribed to, and the new media content is automatically distributed to the mobile telephones 110a or 110b the other subscribers. Further details of the media system 100 and process will now be provided.

Each topic 114a and 114b includes one or more media files 116a and 116b, respectively. The media files 116a and 116b may include digital audio files, images, videos, and the like. The media files 116a and 116b are created by submissions from subscribers via their electronic devices 110, such as the mobile telephones 110a or 110b. The media files 116a and 116b may be compiled into a multimedia presentation that can be accessed by the other subscribers, also via their electronic devices 110.

A topic may be created by a creator 118. The creator may generate a new topic 114 and submit audio content, which are saved in the media files 116. The creator 118 may submit the audio content via a mobile telephone, or other electronic device. In one embodiment, the creator may subscribe to the created topic 114 such that the system will automatically send the creator any new content that is subsequently added to the content. The system 100 may be configured such that any user may be a creator 118 so that any user can create a new topic 114 or add new content to an existing topic through use of a mobile telephone 110.

As mentioned previously, a user of the system 100 may subscribe to one or more of the topics 114. The subscription service 104 tracks each of the users of the system, and manages the topics 114 that each user has subscribed to. By subscribing to the topic, the user is able to access the media content that has been created in association with that topic. Furthermore, in one embodiment, as new media content is added to a topic, the media system 100 automatically produces a notification message to inform the subscriber that new content is available. For example, when the media system 100 detects that new content has been added to a topic 114, the transmission module 106 notifies each of the subscribers of the topic that new content is available. The notification can be sent to the subscribers in many different formats, including Short Messaging System (SMS) messages, Multimedia Messaging System (MMS) messages, Instant Messages (IM), email, voice message, Really Simple Syndication (RSS), and the like. The users may then retrieve the new content using their mobile telephones 110a and 110b.

Furthermore, in one embodiment, the system 100 provides for interactivity of all users by allowing the subscribers of a topic 114 to submit new content to the topic. The subscribers may add new content to a topic 114 using their mobile telephones 110a and 110b. For example, a subscriber may add new content by dialing a given telephone number for communicating with the media system 100, selecting one of the topics 114 to which the subscriber has subscribed. After one of the topics 114 has been selected, the subscriber is prompted to submit audio or other media content to the media system 100. For example, the user may leave a voice message by speaking into the user's mobile telephone 110a or 110b. Upon receiving the media data from the subscriber, the media system 100 adds the data to the appropriate media files 116a or 116b of the selected topic 114a or 114b. The newly received content is then automatically distributed to the mobile telephones 110a and 110b of the other subscribers of the selected topic 114.

In another embodiment, the media system 100 may allow non-subscribers to submit content to some or all of the topics 114. For example, certain topics 114 may benefit from receiving updated content from any individual having new ideas or information to be added to the topic. However, as will be appreciated, other topics 114 may benefit by limiting the source of new content to current subscribers, so as to avoid being deluged with new submissions from unscreened sources.

Content may be submitted in a variety of ways. For example, voice data may be submitted by speaking into a microphone that is located on the subscriber's electronic device 110. For example, a user of a mobile telephone 110a or 110b may dial a phone number that connects the subscriber to the media system 100. Upon connecting to the messaging service 100, the subscriber may be prompted to select a topic 114 that the subscriber would like to add content to. The interface between the media system 100 and the user may include a voice recognition system to enable the user to easily select from the available options or be touch tone enabled, for example. The user then may be prompted to submit the media content by simply speaking into the telephone receiver. In one embodiment, a user may employ a mobile telephone 110a or 110b equipped with a camera to submit images or video. Furthermore, in other embodiment, a subscriber may use a mobile telephone 110a or 110b to submit other forms of media, including SMS messages, MMS messages, IM, and the like.

In addition to using mobile telephones 110a and 110b to submit media content to the media system 100, in one embodiment, a user may use other electronic devices to submit media content. For example, any device able to communicate audio or other media content to the media system 100 may be employed for submitting media content. By way of example, devices which may be used for submitting content may include a portable computer 110c, a personal computer, a wired telephone, a personal digital assistant (PDA), and the like or any combination thereof. The data transmission module 106 may be capable of receiving data via an internet connection, as well as other wired and wireless mediums. In one embodiment, voice data submitted by a caller may be received and recorded by the media system 100 in real-time. In an alternative embodiment, the device 110 may compile a data file containing the new content and may transfer the data file to the media system 100. The media system 100 receives the data file, performs any necessary formatting of the file, and stores it in the appropriate location within the database 102. As mentioned previously, the data file may include a variety of different formats, including an SMS message, an MMS message, an RSS feed, an email, an audio file, an instant message, and the like, as well as other data formats that may be employed by the media system 100.

As mentioned previously, upon receiving the new media content from a subscriber, the media center 100 adds the media content to the appropriate topic 114, as identified by the subscriber. In an illustrated embodiment, the media system 100 compiles the media files 116 submitted for a single topic 114 into a media program that is conveniently accessible by subscribers of the service. For example, from a subscriber's perspective, the media program may have many similarities to a podcast, or the like, and can be accessed via any of the devices 110. A subscriber may be allowed to access all or part of any media program associated with a topic 114. For example, in one embodiment, a newly received media file may be stored in the identified topic 114a or 114b separate from the other media files 116a and 116b already stored in the identified topic. When retrieving the media content, a subscriber of the topic 114 may be provided with the option of selecting individual media files 116 that are of interest to the subscriber, or alternatively selecting to listen to the entire media program containing all of the media files 116.

In another example embodiment, each topic 114 contains a single media file containing all of the media content submitted to the topic. Therefore, when new media content is added, the new media content may be converted into an appropriate media format and added to an existing media file. When a subscriber retrieves the media content, the subscriber may view or listen to the entire media file, or may select portions of the media file that are of interest. For example, a table of contents may be graphically displayed for providing the user with information such as a listing of the various entries contained in the media file, the time each entry was originally submitted, a brief description of the content of each entry, and the like. The user may then select the entries that are of interest.

After adding the media content to the appropriate topic 114, the media system 100 makes the new content available to at least a portion of the subscribers of the identified topic 114. For example, after compiling a list of at least a portion of the users who have subscribed to the identified topic 114, the data transmission module 106 may send the media content to the compiled list of subscribers. In one embodiment where the media content consists of an audio recording, the data transmission module 106 may simply call the phone numbers associated with the subscribers in order to establish a connection with their handsets 110a and 110b. When the handsets 110a and 110b are answered, the data transmission module 106 may transmit the appropriate audio content to the handsets. Prior to transmitting the audio content, a brief message may also be played to inform the subscriber as to the source and topic of the message.

In an alternative embodiment, when new media content is added to a topic 114, the media system 100 provides a notification to at least a portion of the subscribers of the topic. The notification informs the subscribers that new content is available and can be retrieved at a convenient time for the subscriber. The notification can be sent to the subscribers in many different formats, including SMS, MMS, email, voice message, IM, RSS, and the like. In the event that the new media content includes an image and/or a video file, the image and/or video file may be included with the notification message. The notification message may provide a link or other instructions that may be followed in order to retrieve the new media content. For example, the notification message may include a telephone number that the subscriber may dial for retrieving the audio portion of the medial content.

In another embodiment, subscribers may provide preferences regarding the types of notification that the subscriber desires to receive from the media system 100. For example, a subscriber may request that notifications only be sent for new content that was added during certain hours of the day, certain days of the week, as well as other types of time constraints. Furthermore, the subscriber may identify specific key words or phrases, wherein notifications are only sent if the newly added media content pertains to the identified words or phrases. The subscription service 104 may maintain the user preferences, and may refer to the user preferences when generating a list of subscribers to whom a notification message will be sent after new content is added to a topic 114.

By way of example, the topic 114a may relate to the traffic status for a given highway within the city. Individuals having an interest in the traffic levels of the highway may subscribe to the topic 114a. Each subscriber may provide user preferences regarding notifications that the subscriber would like to receive. For example, some subscribers may prefer to receive all notifications regarding new media content added to the topic 114a, and other subscribers may only prefer to receive notifications regarding the new media content that is added during rush hour periods.

A first subscriber may be driving on the highway at 5:00 AM, and may discover very light traffic. The first subscriber can quickly call a phone number related to the traffic topic 114a and leave a brief message describing the light traffic conditions at 5:00 AM. This message is recorded and stored in the media files 116a pertaining to the topic 114a. The data transmission module 106 can then send a notification or the message itself to the other subscribers who requested to receive updates created at 5:00 AM. A second subscriber driving on the highway at 7:00 AM may discover a moderate traffic level. The second subscriber can also quickly call the appropriate phone number and leave a new message describing the updated traffic conditions. This new message is also recorded and distributed to the other subscribers. As each subscriber obtains new information pertaining to the traffic level of the highway, such as accidents, road construction, road conditions, and the like, the subscriber is able to provide updates by calling the phone number. In this fashion, the present invention allows a large number of subscribers to obtain up-to-date information regarding the topic 114a.

Figure 2:
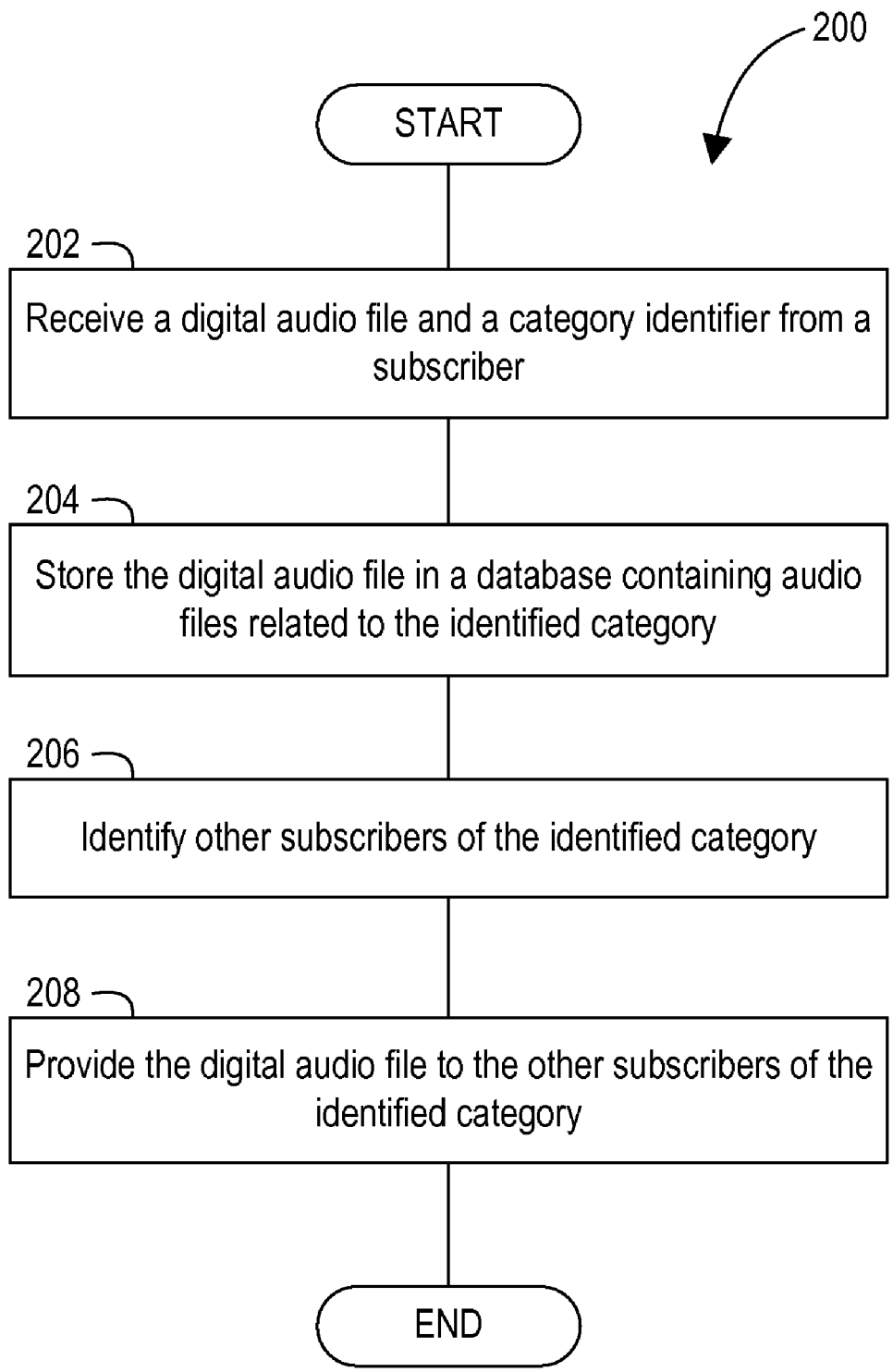
FIG. 2 illustrates a flow diagram of one example of a method of providing a messaging service.

FIG. 2 illustrates one embodiment of a method 200 of providing a subscriber-based messaging service. The method 200 may be practiced, for example, in a messaging system or media system capable of communicating with a plurality of electronic devices. In one embodiment, the media system receives 202 a digital media file and an identifier from a subscriber. Alternatively, the subscriber may select or identify the identifier at a later time, for example when connecting to the media system. The identifier identifies a category containing or associated with digital media files relating to a common topic. In one embodiment receiving the digital media file and the identifier may include receiving the digital media file from a handheld mobile device, such as a mobile telephone. In another embodiment, the digital media file and the identifier may be received from a device communicating via the Internet, such as a personal computer. After the media file is received, the media system may also prompt the subscriber to identify the category, for example, from a list of category identifiers. Thus, the subscriber can select the identifier, which is then used by the media system as described herein.

The digital media file is stored 204 in a database containing the files relating to the identified category associated with the identifier. For example, as illustrated in FIG. 1, the database 102 may organize the media files 116 into various topics 114. In one embodiment, submitted media files may be automatically formatted as necessary prior to storing them in the database 102. For example, each media file may be converted to a particular format used by the system 100. Furthermore, the media files may be edited to enhance the media experience of the future viewers and listeners. For example, predefined introductions, background music, time limits, graphics, text, and the like may be added for refining the look and feel of each media submission.

The method 200 identifies 206 at least a portion of the other subscribers of the identified category, and provides 208 the newly received media file to the other identified subscribers of the category. By way of example, the digital media file may be communicated to the handheld wireless devices associated with the identified subscribers.

In one embodiment, providing the media file the other subscribers of the identified category may include communicating a notification to the other subscribers immediately after receiving the digital media file. The notification may provide the recipients of the notification with the ability to retrieve the newly added digital media file at a later time or simply inform the recipients of new media content. The notification may also identify the category of content.

The method 200 may further enable subscribers to create a new category. For example, a request may be received from a user to generate a new category relating to a new topic. Then, a new category may be generated for containing digital media files relating to the new topic. Subsequently, any new media files received that relate to the new category will be placed in a database relating to the new category.

Figure 3:
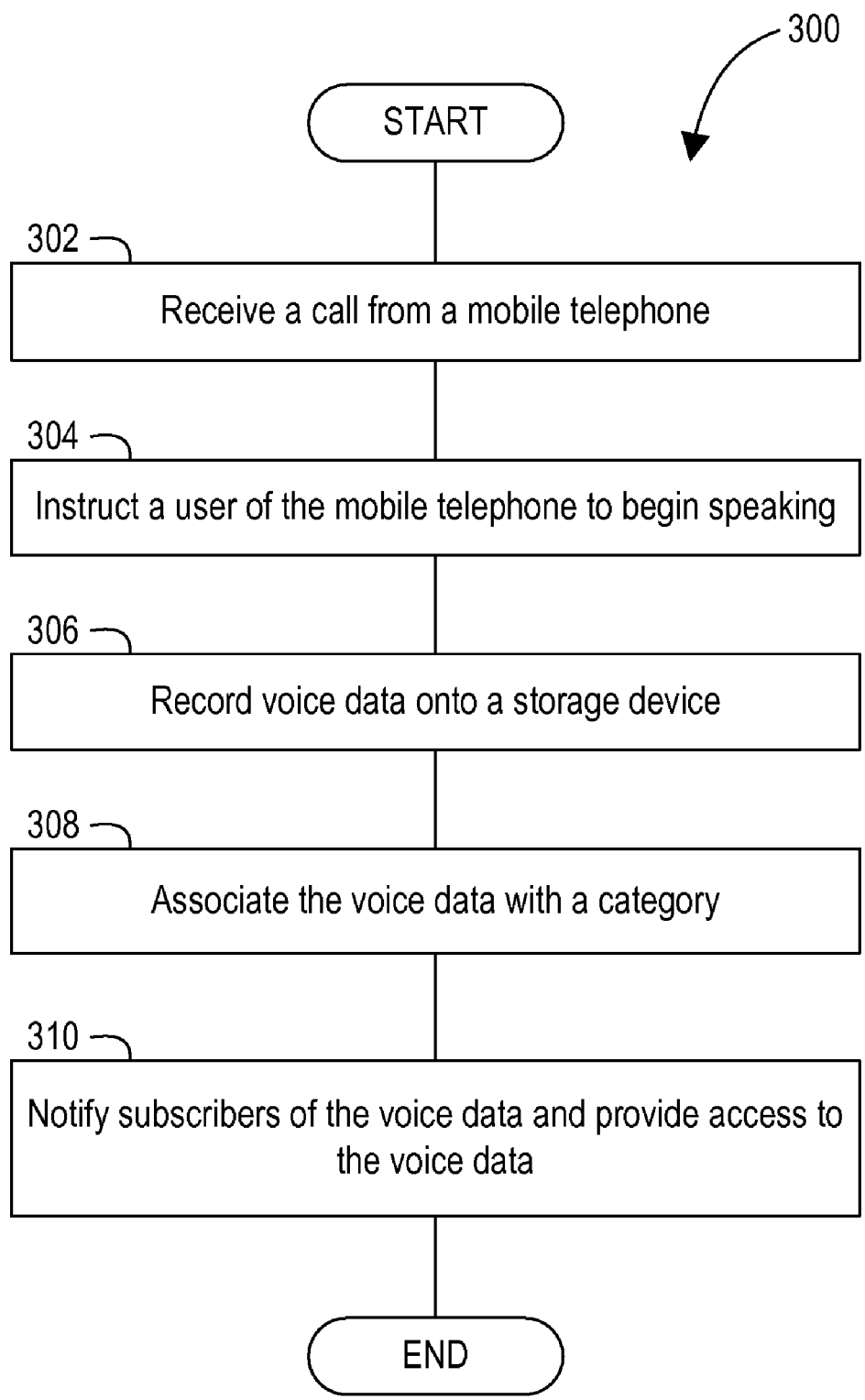
FIG. 3 illustrates a flow diagram of one example of a method of providing a mobile telephone messaging and distribution service.

FIG. 3 illustrates one embodiment of a method 300 of providing a mobile telephone messaging and distribution service. The method 300 facilitates the creation of media content and the distribution of this media content to a group of users. In one embodiment, the media system receives 302 a call from a mobile telephone. After establishing a connection with the mobile telephone, the media system instructs 304 a user of the mobile telephone to begin speaking. The mobile telephone user typically leaves a message relating to a topic of interest, and the media system records 306 the voice data received from the user onto a storage device.

The voice data received from the user is associated 308 with a category designated for a common topic. For instance, the media system may prompt the subscriber to identify the category, for example, from a list of category identifiers. Thus, the subscriber can select the identifier, which is then used by the media system as described herein.

Once the voice data is recorded at the media system and associated with a category, the media system notifies 310 subscribers of the category of the newly received voice data and provides the subscribers with access to the voice data. For example, as described previously, a notification may be sent to the subscribers' mobile telephones in the form of an SMS message, an MMS message, an email, an RSS feed, an audio message, an instant message, and the like. The user may conveniently retrieve the voice data, for example, by dialing a phone number included within the notification.

As described previously, the method 300 provides an interactive interface for the users, and allows each subscriber to add additional content to any category by simply using the subscriber's mobile telephone. As new content is added to a category, the content is automatically distributed to the other subscribers of the category by sending a notification to the subscribers' mobile telephones.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A media system, comprising:
   a database containing digital media files, each digital media file associated with one of a plurality of categories;
   a subscription service configured to receive and record subscription requests from subscribers, wherein each subscriber subscribes to one or more of the categories;
   a receiving module configured to receive a new digital media file from one of the subscribers via mobile telephones of the subscribers, the digital media file associated with one or more categories based on at least one identifier provided by the subscriber; and
   a transmission module configured to provide the new digital media file to the mobile telephones of the subscribers of the category associated with the new digital media file,
   wherein the digital media files within one of the categories are compiled into a media program relating to a topic associated with the category, wherein the subscriber accesses the media program by selecting one or more of the media files within one of the categories.

2. The media system as recited in claim 1, wherein the receiving module receives the new digital media file by receiving a call from the mobile telephone and receiving voice data from a user of the mobile telephone.

3. The media system as recited in claim 1, wherein the transmission module communicates a notification to the subscribers of the category associated with the new digital media file so that the subscribers are able to retrieve the new digital media files at a later time.

4. The media system as recited in claim 3, wherein the notification is sent to the mobile telephones of the subscribers immediately after the new digital media file is received by the media system.

5. The media system as recited in claim 3, wherein the notification is selected from a group comprising a short messaging system (SMS) message, a multimedia messaging system (MMS) message, an email, an audio message, a really simple syndication (RSS) feed, and an instant message.

6. The media system as recited in claim 3, wherein the notification includes a phone number and the subscribers retrieve the new digital media file via their mobile telephones by dialing the phone number.

7. The media system as recited in claim 3, wherein the subscription service is further configured to maintain user preferences for each of the subscribers regarding the notifications that each subscriber requests to receive.

8. The media system as recited in claim 1, wherein the database is further configured to compile a single digital media file for each of the categories, the single digital media file containing at least a portion of the plurality of the digital media files associated with the category.

\* \* \* \* \*